Jan. 1, 1952        G. H. ROGERS        2,580,599
SWEET CORN ON THE COB SELECTING, TRIMMING AND PACKING MACHINE
Filed April 17, 1948        10 Sheets-Sheet 1
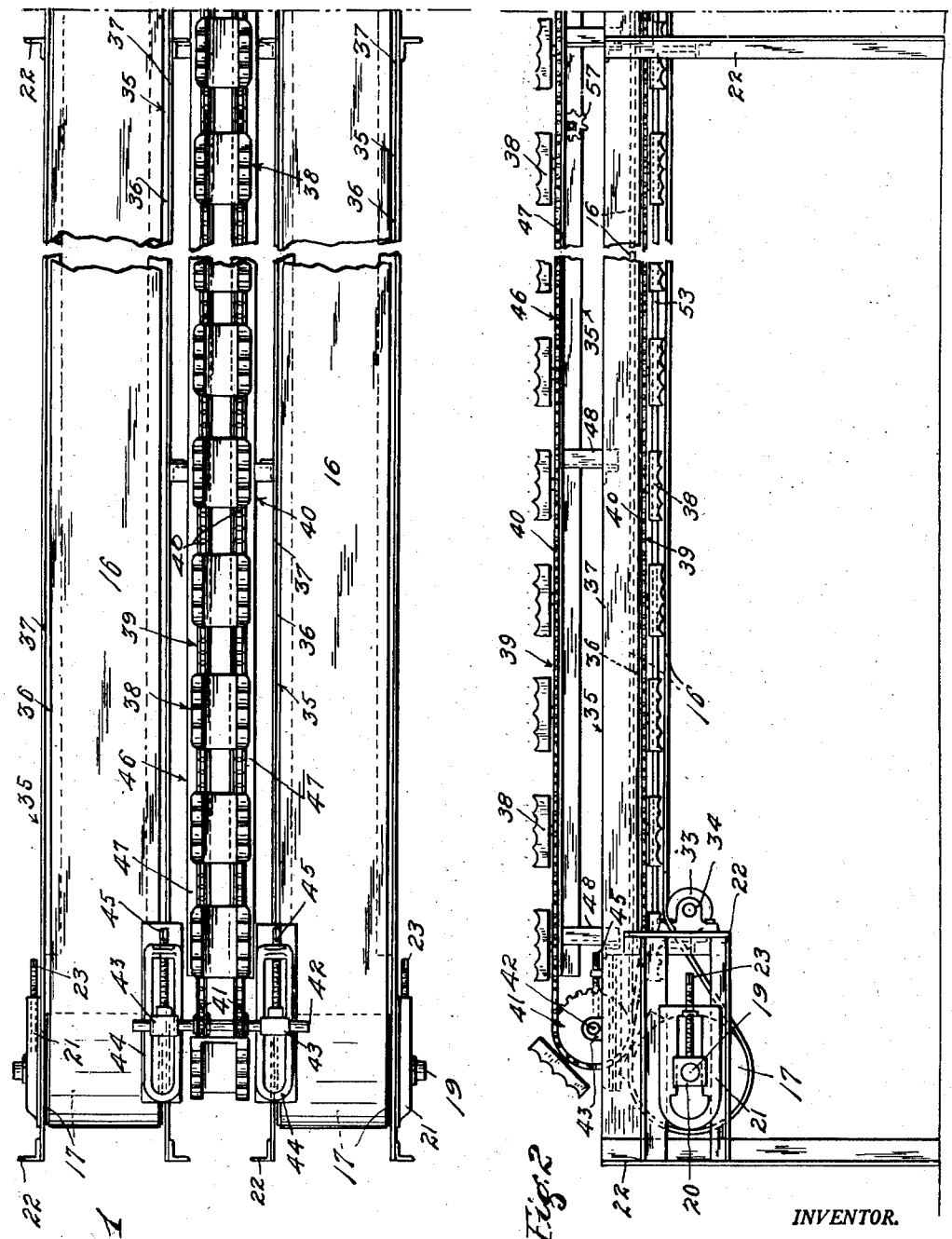
INVENTOR.
Grant H. Rogers
BY
Harry D. Kilgore
Attorney Jan. 1, 1952     G. H. ROGERS     2,580,599
SWEET CORN ON THE COB SELECTING, TRIMMING AND PACKING MACHINE
Filed April 17, 1948     10 Sheets-Sheet 2
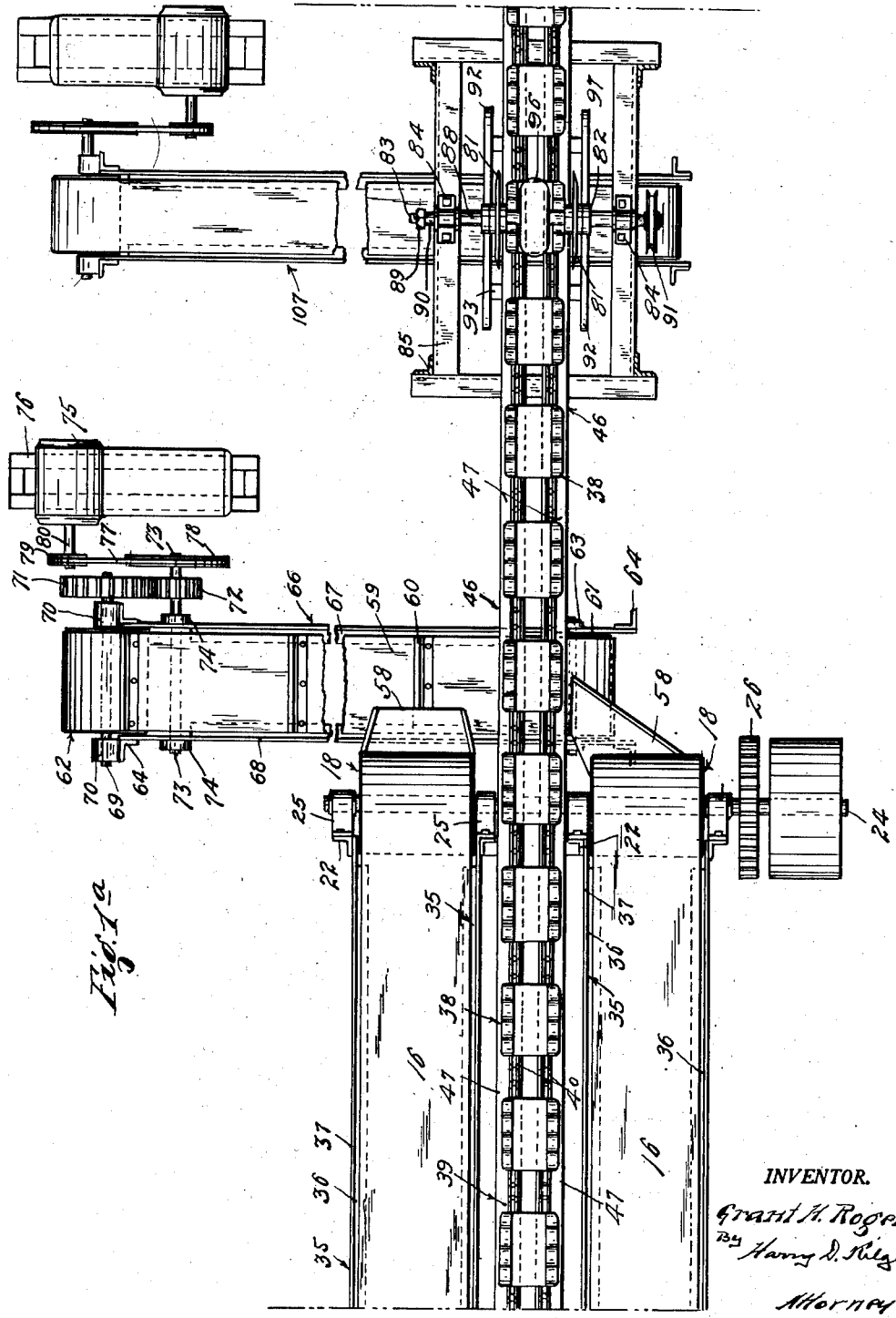
INVENTOR.
Grant H. Rogers
By Harry D. Kilgon
Attorney Jan. 1, 1952        G. H. ROGERS        2,580,599
SWEET CORN ON THE COB SELECTING, TRIMMING AND PACKING MACHINE
Filed April 17, 1948        10 Sheets-Sheet 3
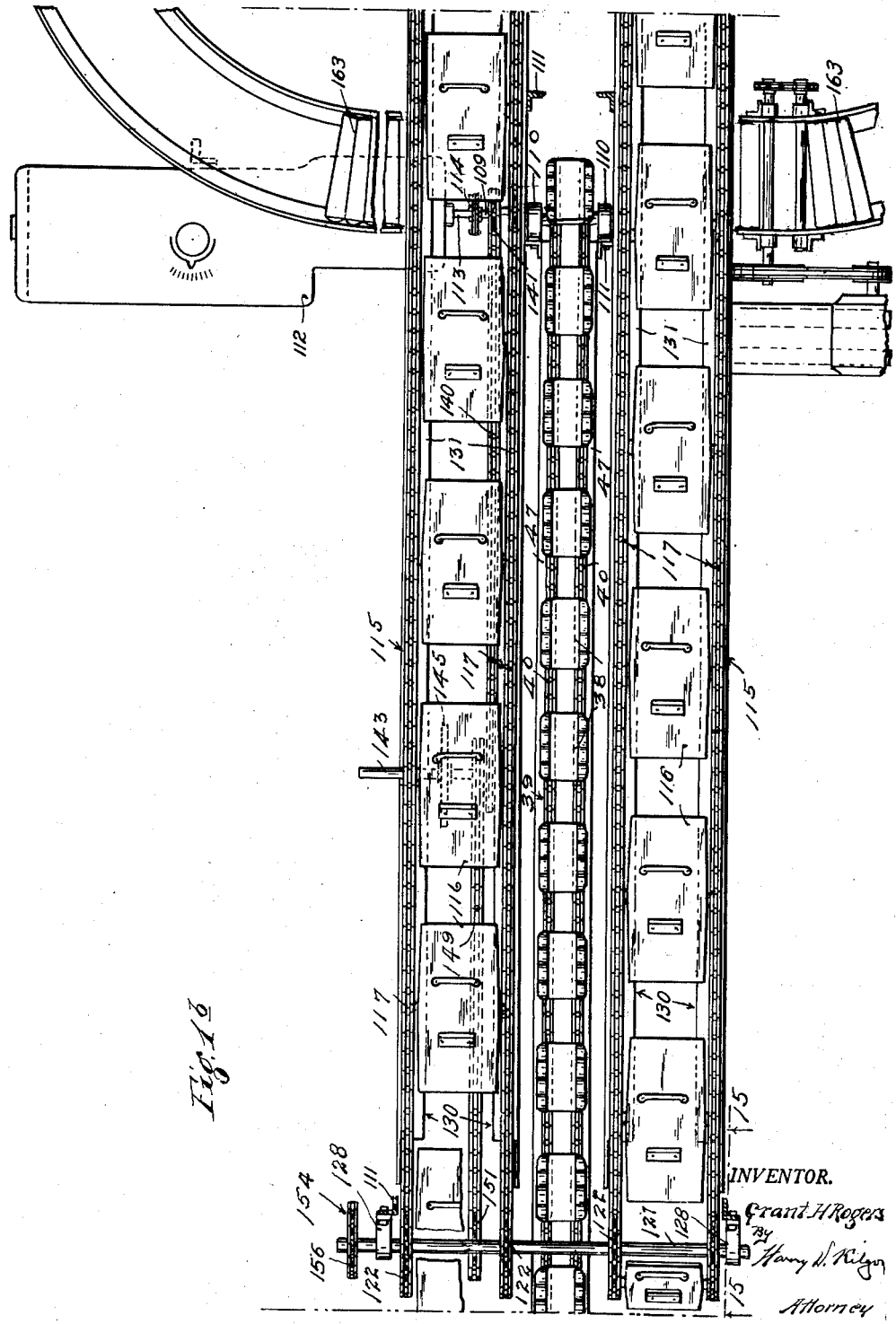
INVENTOR.
Grant H Rogers
By Harry N. Kilgor
Attorney

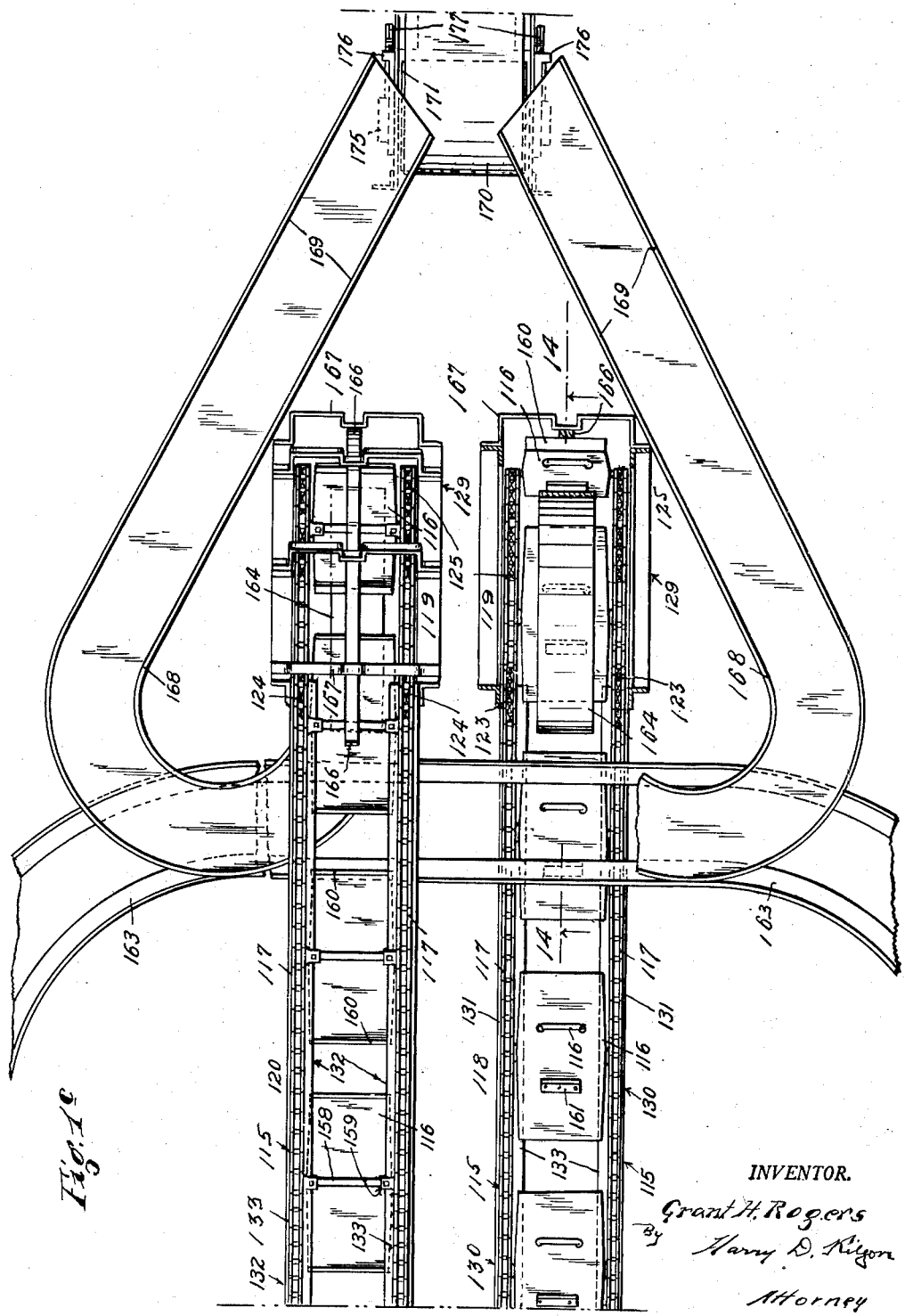

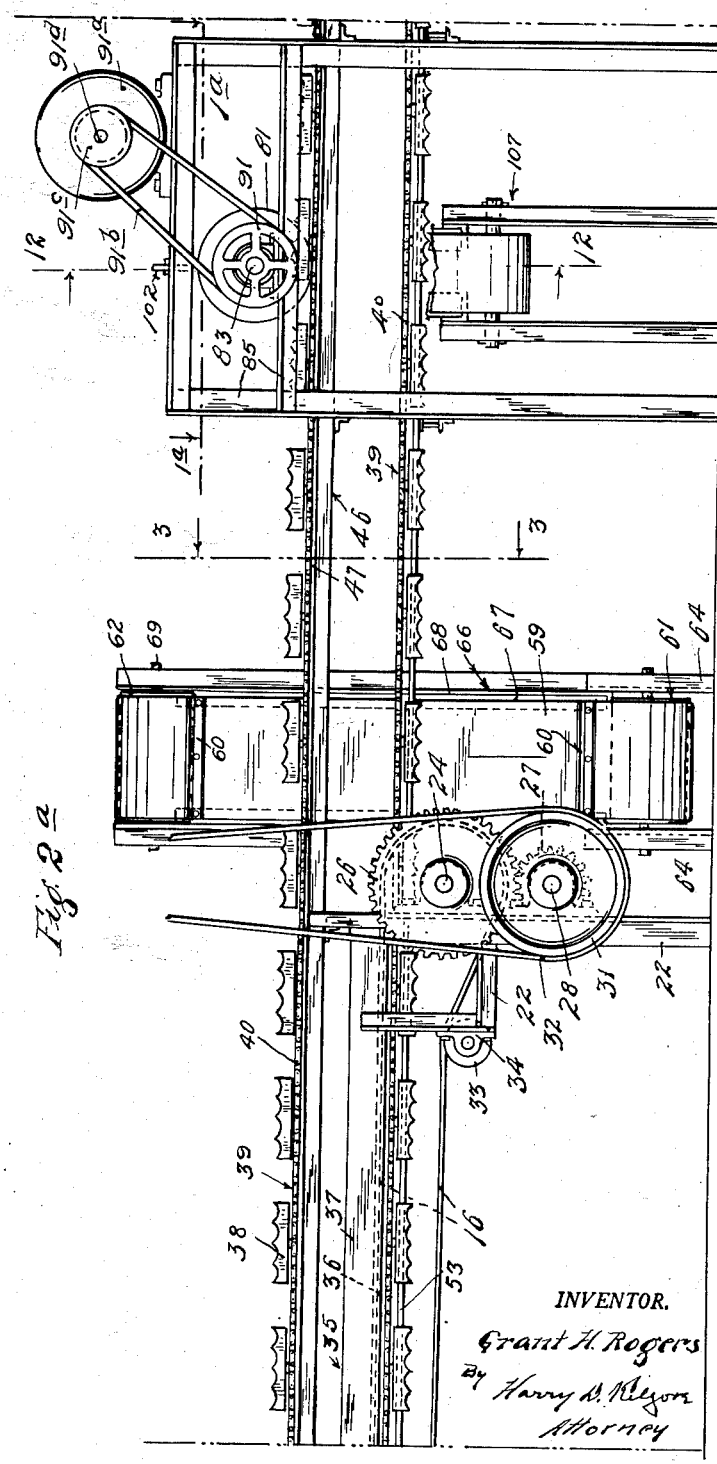

Jan. 1, 1952     G. H. ROGERS     2,580,599
SWEET CORN ON THE COB SELECTING, TRIMMING AND PACKING MACHINE
Filed April 17, 1948     10 Sheets-Sheet 6
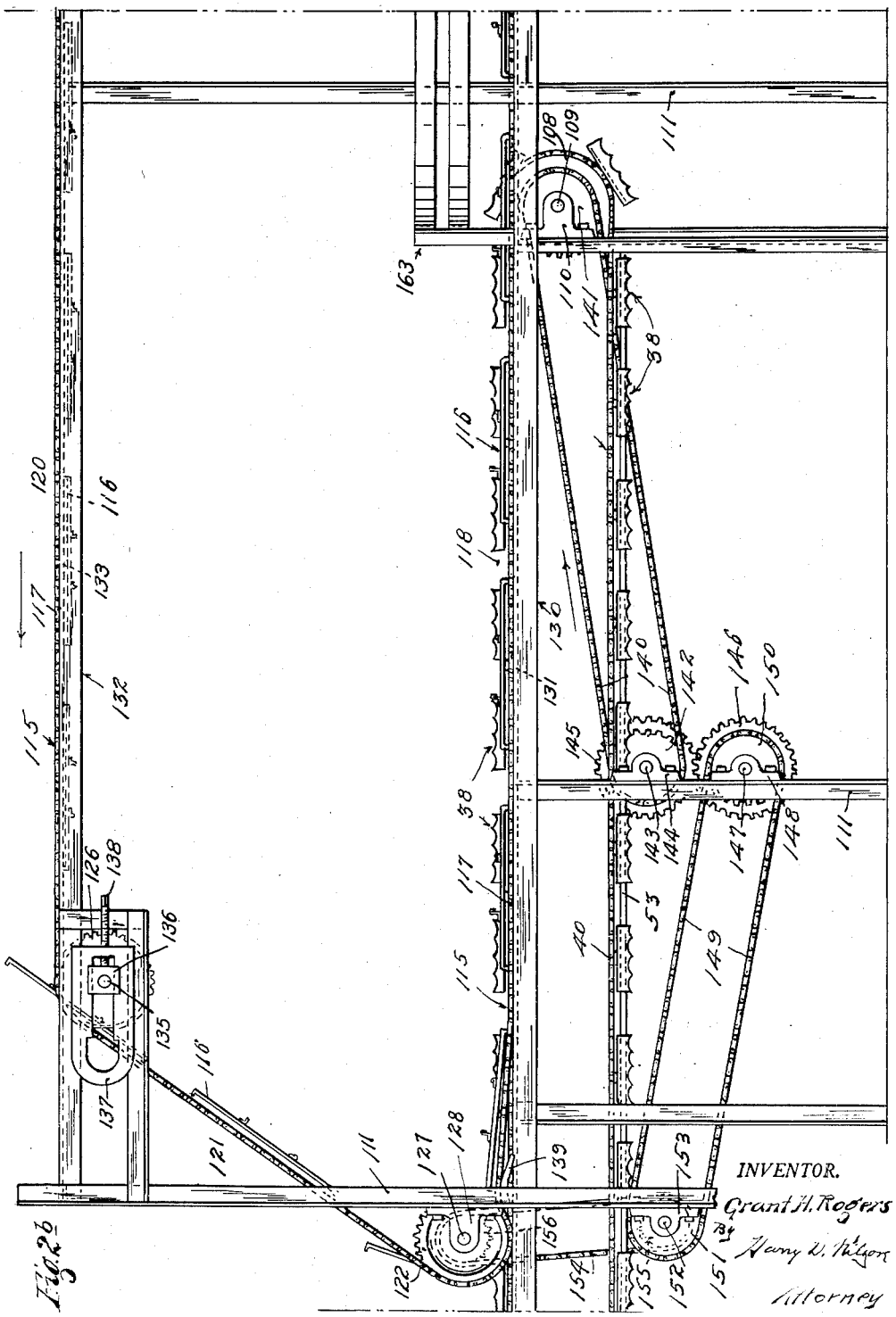

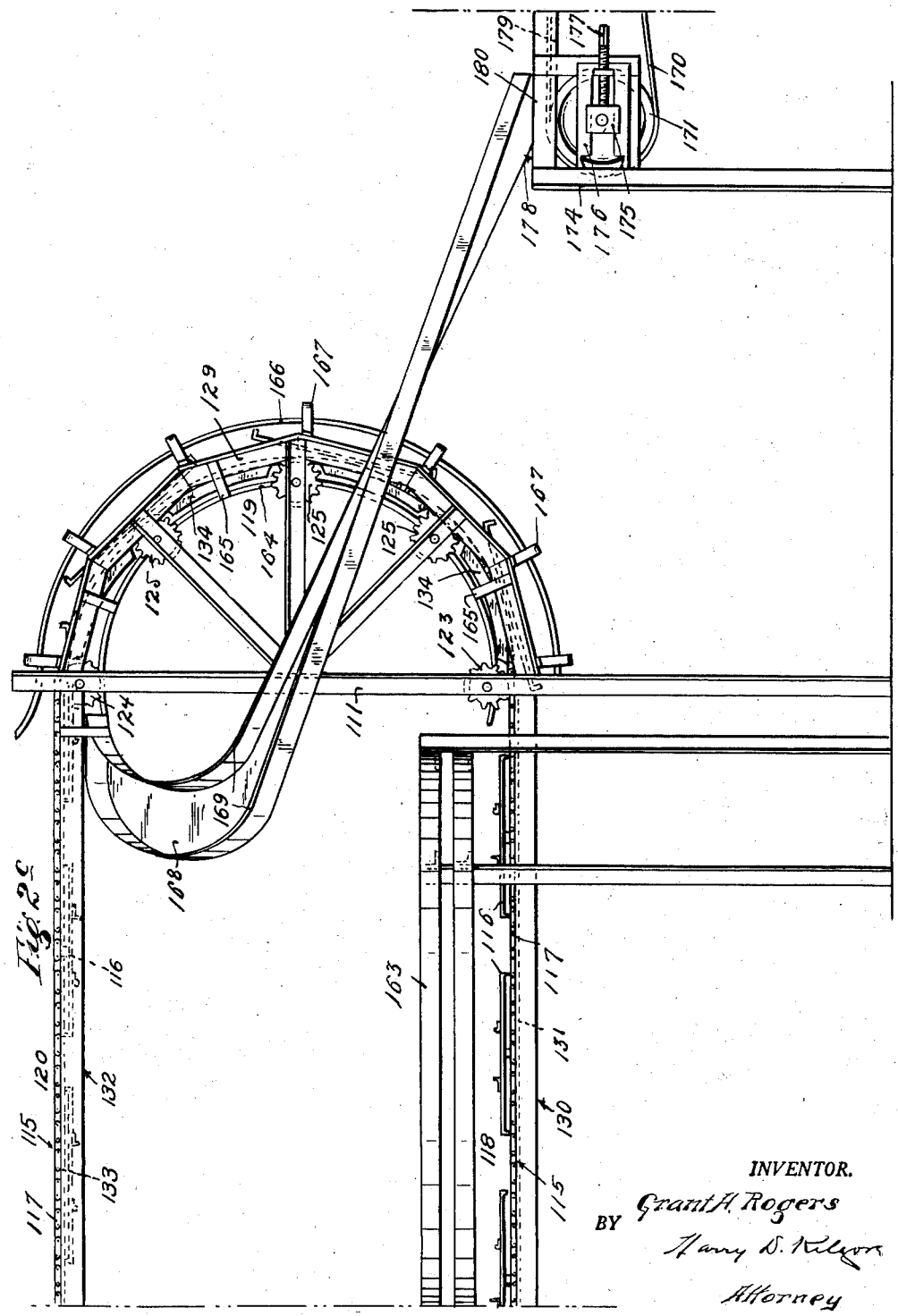

Jan. 1, 1952 G. H. ROGERS 2,580,599
SWEET CORN ON THE COB SELECTING, TRIMMING AND PACKING MACHINE
Filed April 17, 1948 10 Sheets-Sheet 8
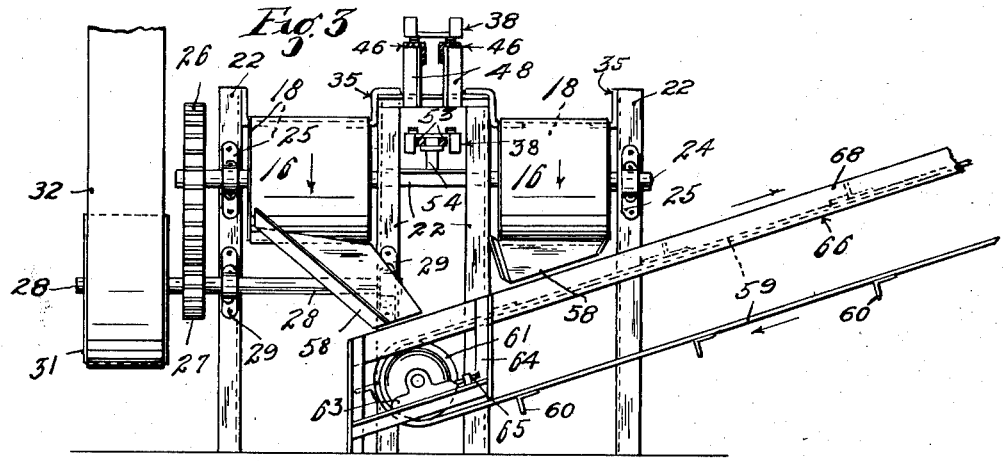
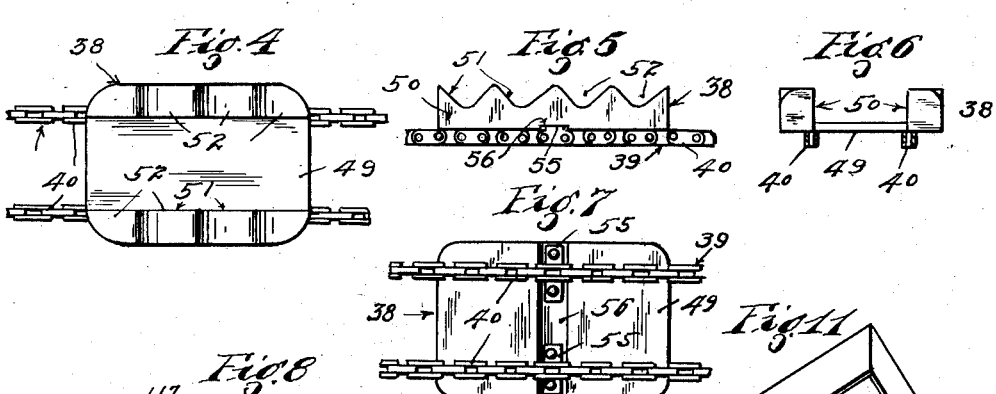
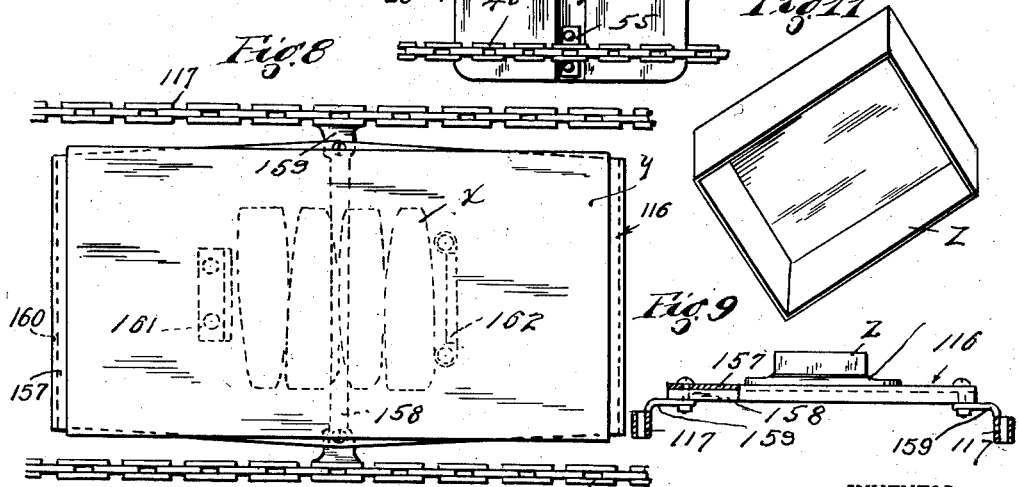
INVENTOR.
Grant H. Rogers
BY Harry D. Kilgore
Attorney Jan. 1, 1952 G. H. ROGERS 2,580,599
SWEET CORN ON THE COB SELECTING, TRIMMING AND PACKING MACHINE
Filed April 17, 1948 10 Sheets-Sheet 9
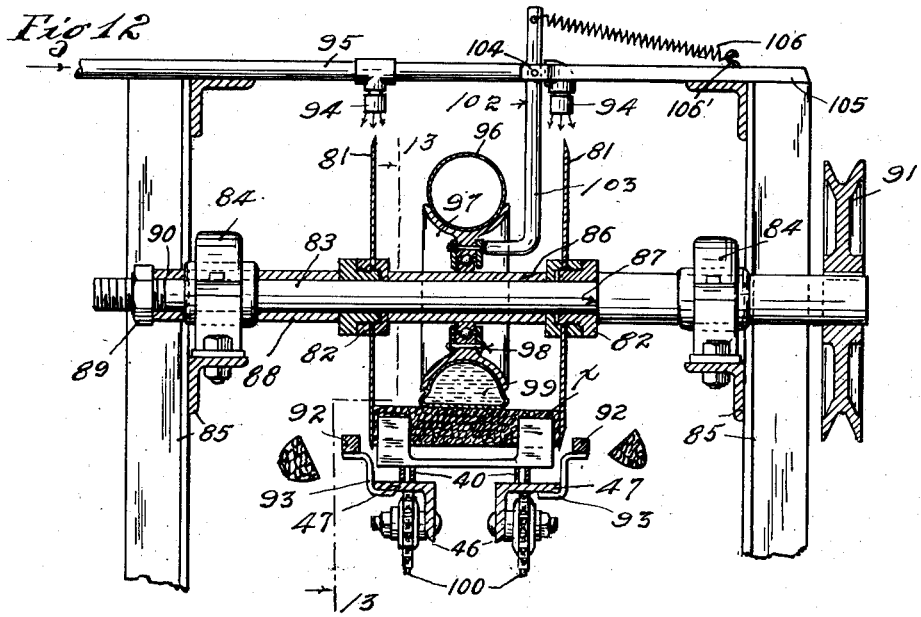
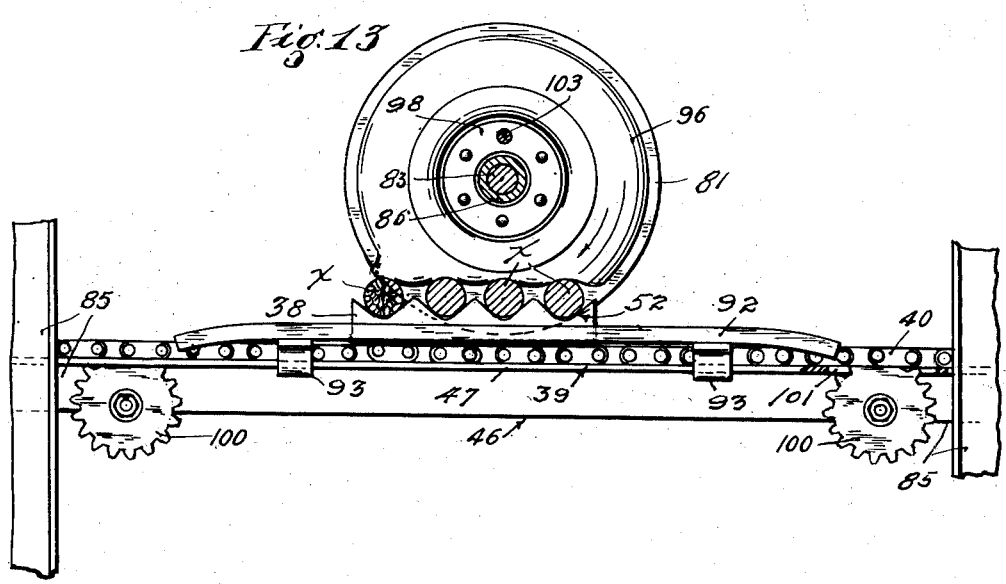
INVENTOR.
Grant H Rogers
Harry D. Kilgore
Attorney Jan. 1, 1952  G. H. ROGERS  2,580,599
SWEET CORN ON THE COB SELECTING, TRIMMING AND PACKING MACHINE
Filed April 17, 1948  10 Sheets-Sheet 10
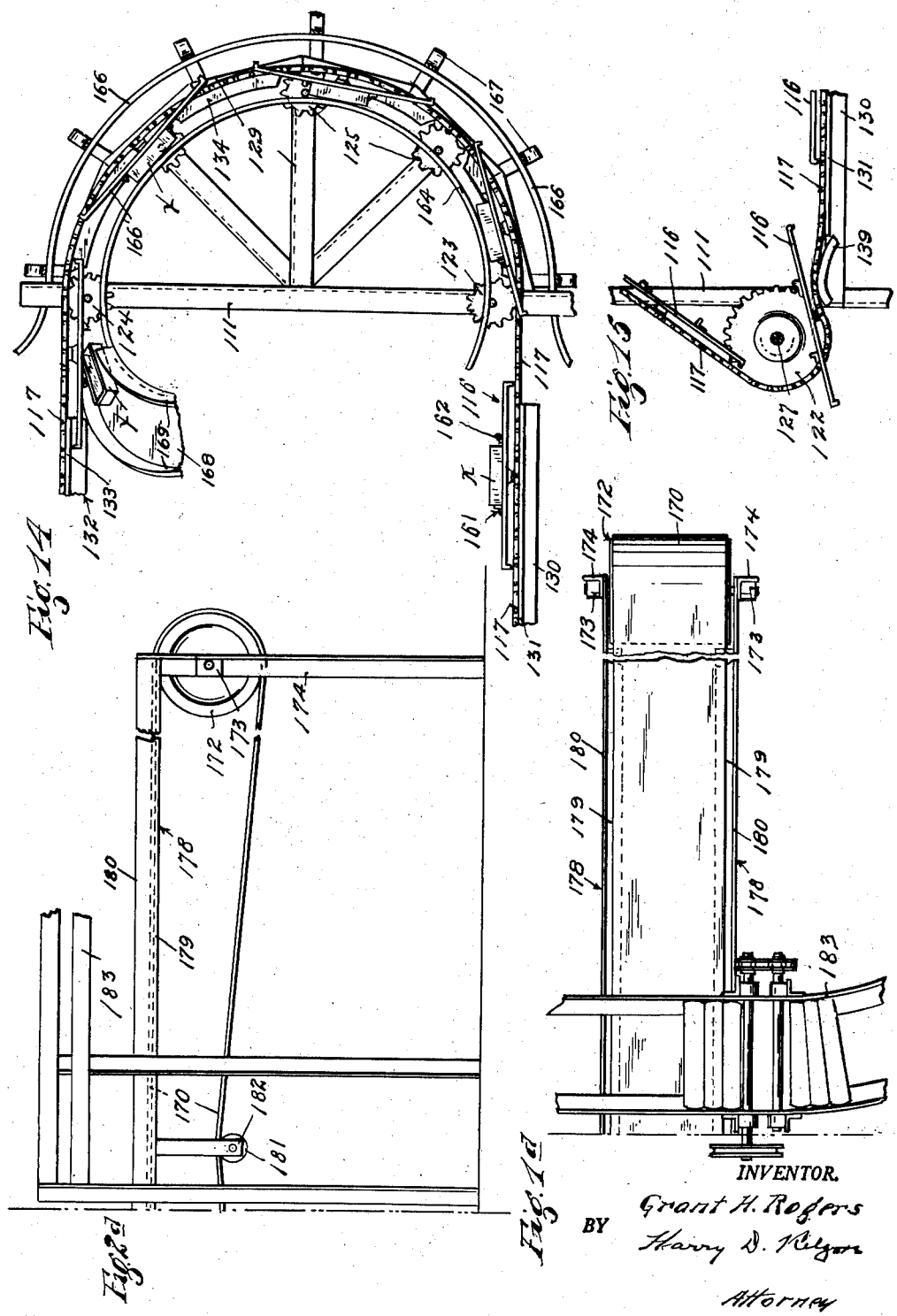
INVENTOR.
Grant H. Rogers
BY Harry D. Kilgore
Attorney Patented Jan. 1, 1952

2,580,599

UNITED STATES PATENT OFFICE 2,580,599

SWEET CORN ON THE COB SELECTING, TRIMMING, AND PACKAGING MACHINE

Grant H. Rogers, Fairmont, Minn., assignor to Fairmont Canning Company, Fairmont, Minn., a corporation of Minnesota Application April 17, 1948, Serial No. 21,584

14 Claims. (Cl. 226—2)

My present invention relates to improvements in novel means for use in selecting, trimming and packaging sweet corn on the cob, and also a novel method of packaging the same. For the sake of brevity, corn on the cob will hereinafter be referred to as "ears" or "ear of corn."

One of the objects of this invention is to provide novel means for conveying, in groups, selected ears of corn, each group comprising a predetermined number of ears individually held in definite relation to each other.

A further object of this invention is to provide novel means for holding and trimming ears of corn to a predetermined length.

A still further object of this invention is to provide a novel method of packaging groups of ears of corn and in conveying the same during the packaging thereof.

Other objects of this invention will be apparent from the following description, reference being had to the drawings.

To the above end, generally stated, the invention consists of the devices and combination of devices and a novel packaging method hereinafter described and defined in the claims.

In the accompanying drawings, which illustrate one embodiment of the invention, like characters indicate like parts throughout the several views.

Referring to the drawings:

Figs. 1, 1ª, 1ᵇ, 1ᶜ and 1ᵈ are plan views showing progressive sections of the entire machine from the rear to the front thereof, some parts of Fig. 1ª being sectioned on the line 1ª—1ª of Fig. 2ª, portions of all of said figures being broken away, a portion of Fig. 1ᶜ being sectioned and Figs. 1ᵇ, 1ᶜ and 1ᵈ and 2ᵈ further showing fragments of empty box-conveying means and box-cover-conveying means, respectively;

Figs. 2, 2ª, 2ᵇ, 2ᶜ and 2ᵈ are elevational views of the machine shown in Figs. 1, 1ª, 1ᵇ, 1ᶜ and 1ᵈ, respectively;

Fig. 3 is a view principally in end elevation, some parts being sectioned on the line 3—3 of Fig. 2ª;

Figs. 4, 5, 6 and 7 are views of one of the corn jigs, on an enlarged scale, in plan, side elevation, end elevation and bottom plan, respectively, together with fragments of the attached conveyor sprocket chains;

Fig. 8 is a plan view of one of the packaging jigs and fragments of the attached conveyor sprocket chains and also showing a sheet of "cellophane" spread on said jig together with a group of ears of corn on the "cellophane" sheet;

Fig. 9 is an end elevation view of the packaging jig, shown in Fig. 8, some parts being broken away and sectioned;

Fig. 10 is a side view of the packaging jig shown in Fig. 8, and further showing the ears of corn wrapped in the "cellophane" sheet and an empty inverted box placed over the wrapped ears of corn;

Fig. 11 is a perspective view of the inverted box shown in Fig. 10;

Fig. 12 is a fragmentary detail view partly in elevation and partly in section taken on the line 12—12 of Fig. 2ª, on an enlarged scale;

Fig. 13 is a fragmentary detail view, principally in elevation, of certain of the parts shown in Fig. 12, some parts being sectioned on the irregular line 13—13 of Fig. 12;

Fig. 14 is a fragmentary view, principally in side elevation with some parts sectioned on the line 14—14 of Fig. 1ᶜ; and Fig. 15 is a fragmentary detail view, principally in side elevation, with some parts sectioned on the line 15—15 of Fig. 1ᵇ.

The improved machine will be described from its receiving or rear end to its delivery or front end.

The rearmost section of the machine, which pertains to the selecting of eatable corn on the cob, includes a pair of parallel endless continuously moving inspecting belts 16 edgewise spaced apart. Each belt 16 runs over a large rear idle roll 17 and a driven front roll 18 of the same size. The two idle rolls 17 are secured on a shaft 19 journaled in bearings 20 slidably mounted in ways 21 on a frame 22 for the respective section of the machine. The bearings 20 are held, where positioned, by long adjusting screws 23 having threaded engagement in the ways 21 and afford belt tighteners. The rolls 18 are secured to a driven shaft 24 journaled in bearings 25 on the frame 22.

On one end portion of the shaft 24 is a large spur gear 26 that meshes with a small spur gear 27 on a countershaft 28 journaled in bearings 29 on the frame 22. Outward of the spur gear 27 on the shaft 28 is a pulley 31 over which a belt 32 runs and driven by an electric motor, not shown. The lower run of each belt 16 runs over a pair of directional rolls 33 journaled in bearings 34 on the frame 22. One of these rolls 33 is relatively close to the idle roll 17 and the other thereof is relatively close to the driven roll 18.

The frame 22 includes a pair of horizontal parallel angle bars 35 for each belt 16 and the inturned horizontal flanges thereof afford a pair of track rails 36 on which the longitudinal edge portion of the belt travels.

The vertical flanges of the angle bars 35 extend upwardly and afford side members 37 that prevent the ears of corn on the belt 16 from being deflected therefrom.

Husked ears of corn on the cob are delivered onto the rear end portions of the belts 16 by a conveyor belt, not shown, after having carried said ears of corn under overhead angling jets of water that thoroughly wash the same to remove corn silk, parts of husks and other loose particles.

It may be here stated that in actual usage of the machine, a long bench, for operators, on a raised platform, not shown, will extend outwardly of and parallel to each belt 16.

Operators sitting on the benches select the best ears of corn of nearly the same size from the mass of ears on the belts 16, moving in front of them, and place the same on corn jigs 38 on an endless continuously moving conveyor 39 between the two belts 16 and above the same.

The conveyor 39 includes a pair of endless sprocket chains 40 that run over a pair of idle sprocket wheels 41, at the rear end of the machine, and a pair of driven sprocket wheels, as will presently appear. The sprocket wheels 41 are mounted on a shaft 42 journaled in bearings 43 slidably mounted in ways 44 on the two innermost angle bars 35, and long conveyor tightening screws 45 have threaded engagement with said ways and impinge the bearings 43. The upper run of the chains 40 slidably rest on the outturned horizontal flanges of a pair of angle bars 46 and which flanges afford track rails 47 for said chains. The vertical flanges of the angle bars 46 extend downwardly and are secured to short posts 48 on the two innermost angle bars 35 and support the angle bars 46 therefrom.

Each corn jig 38 is in the form of a flat rectangular plate 49 having a pair of wide upstanding side flanges 50, each of which has in its upper face, as shown, four longitudinally spaced V-notches 51. The notches 51 in the two side flanges 50 are aligned transversely of the corn jig 38 and afford two-part seats 52 that center the ears therein. These seats 52 individually hold four ears of corn $x$ that extend transversely of the jig 38 with their end portions extending outwardly thereof to be trimmed, as will presently appear. To facilitate the packaging of the four ears of corn $x$ and give the group thereof a symmetrical appearance, said ears are alternately turned end for end, as they are placed on the jig 38, so that there are two big ends and two small ends of the ears of corn $x$ in each section of each seat 52. The lower run of the chains 40 travels on track rails 53 supported by short posts 54 on the frame 22, see Fig. 3.

The corn jigs 38 overlie the chains 40 and are secured thereto at longitudinally spaced points and endwise spaced apart by pairs of brackets 55 on certain of the links in the chains 40. These brackets 55 extend into transverse channels 56 in the under sides of the corn jigs 38, at the longitudinal centers thereof and are rigidly secured to said jigs, see Fig. 7. To hold the upper run of the chains 40 for straight line travel on the track rails 47, the same run over and mesh with small sprocket wheels 57 journaled on the depending flanges of the angle bars 46 and work in apertures in the track rails 47.

Surplus ears of corn on the belts 16 are discharged from front ends thereof onto forwardly and downwardly inclined chutes 58 on the frame 22. Ears of corn on the chutes 58 slide downwardly by the force of gravity onto the lower end portion of an upwardly inclined elevator belt 59 having transverse cleats 60. This elevator belt 59 extends transversely of the belts 16 and runs over a lower idle roll 61 and a driven upper roll 62. The lower roll 61 is journaled in bearings 63 slidably mounted on a frame 64 and held where adjusted by long belt-tightening screws 65.

The frame 64 includes a pair of inclined angle bars 66, the horizontal flanges of which extend inwardly and afford track rails 67 on which the longitudinal edge portions of the belt 59 travel. The vertical flanges of the angle bars 66 extend upwardly and afford side members 68 that prevent ears of corn on the belt 59 from being deflected therefrom.

The driven roll 62 is mounted on a shaft 69 journaled in bearings 70 on the frame 64. A large spur gear 71 on the shaft 69 meshes with a small spur gear 72 on a counter-shaft 73 journaled in bearings 74 on the angle bars 66. The countershaft 73 is driven from an electric motor 75, mounted on a base 76, by a V-belt 77 that runs over a large V-pulley 78 on said countershaft and a small V-pulley 79 on the armature shaft 80 of said motor.

The next or second section of the machine, shown in Figs. 1ª, 2ª, 12 and 13, is directed to novel means for trimming the end portions of the ears of corn $x$ on the corn jigs 38 and to novel means for holding said ears of corn in the seats 52 while they are being trimmed.

The trimming mechanism includes a pair of laterally spaced circular cutters 81, between which the conveyors 39 move the corn jigs 38 and feed the ears of corn $x$ thereto. These cutters 81 are each provided with a sectional hub 82 that extends axially therethrough and hold the cutters 81 with a clamping action. The hubs 82 are telescoped onto a shaft 83 journaled in bearings 84 on a frame 85 which carries the respective sections of the angle bars 46. A central sleeve 86, on the shaft 83 between the cutters 81, is engaged at its end, by the hub 82 and holds said cutters spaced apart a predetermined distance that governs the length of the ears of corn $x$ after they have been trimmed by the cutters 81.

The left-hand portion of the shaft 83, in respect to Fig. 12, is reduced in diameter and forms a shoulder 87 that affords a base of resistance for the right-hand hub 82. A spacing sleeve 88 on the shaft 83 is interposed between the left-hand hub 82 and the bearing 84. On the reduced end portion of the shaft 83 is a nut 89 and a short sleeve 90 interposed between said nut and the adjacent hub 82. This nut 89 and the shoulder 87 hold all of the parts therebetween tightly clamped together so that the cutters 81 rotate with the driven shaft 83. On the right-hand end portion of the shaft 83 is a large V-pulley 91 driven from an electric motor 91ª on the frame 85. A V-belt 91ᵇ runs over the pulley 91 and a V-pulley 91ᶜ on the armature shaft 91ᵈ of the motor 91.

A pair of parallel bars 92 are closely positioned, one to the outer face of each of the cutters 81, for supporting the end portions of the ears of corn $x$ in order that they may be given cleaner cuts by said cutters. These bars 92 are secured by brackets 93 to the angle bars 46. Water is sprayed on the revolving cutters 81 to prevent starch formation thereon by two nozzles 94 on a water supply pipe 95 on the frame 85 and leading from any suitable source of supply, under pressure, not shown.

The ears of corn x are yieldingly held in the seats 52, while being trimmed by the cutters 81, by a pressure wheel, as shown, a small pneumatic tire 96 that turns in a vertical plane midway between the two cutters 81 and over the moving corn jigs 38. This tire 96 is mounted on a wheel rim 97 which, in turn, is mounted on an antifriction bearing 98 on the shaft 83. The outer member of the bearing 98 is a rigid part of the wheel rim 97 and the inner member thereof is rigid with the shaft 83. The purpose of this anti-friction bearing 98 is to permit relative turning movements of the shaft 83 and the tire 96. The tire 96 is partly filled with water 99 to give the same adequate weight on the ears of corn x and is inflated with sufficient air to give the same the desired size, see Figs. 12 and 13.

The chains 40 are held for straight line travel on the track rails 47 by front and rear pairs of sprocket wheels 100 journaled in the vertical flanges of the angle bars 46 and working in slots 101 in the track rails 47, see Fig. 13. The purpose of these sprocket wheels 100 is to hold the respective sections of the sprocket chains 40 and thus successively guide the corn jigs 38 centrally between the cutters 81.

Obviously, the tire 96 is turned by the transverse ears of corn x moving thereunder on the jigs 38 and held at the desired speed by a friction brake 102. This brake 102 is in the form of an L-shaped rod 103, the longitudinal section of which is intermediately pivoted at 104 to a crosstie bar 105 on the frame 85 for swinging movement transversely of the tire 96. A coiled spring 106 anchored at one end to the crosstie bar 105, as indicated at 106', and attached at its other end to the rod 103 at its upper end and yieldingly holds the outer end of the short section of the rod 103 in frictional contact with the section of the anti-friction bearing 98 on the wheel rim 97.

A refuse conveyor, indicated as an entirety by the numeral 107, extends at its receiving end portion and transversely through the frame 85 directly under the cutters 81. This refuse conveyor 107 is quite similar to the surplus corn conveyor and it is not thought necessary to further describe the same.

Referring now in detail to the corn transfer and packaging section of the machine that is just forward of the trimming section thereof: the conveyor 39 extends into this section of the machine and the sprocket chains 40 at their front end portions run over a pair of sprocket wheels 108 on a driven shaft 109 journaled in bearings 110 on a frame 111. This shaft 109 is driven from a gear reduction motor with a variable speed drive, indicated as an entirety by the numeral 112 with the exception of the drive shaft 113 axially aligned with the shaft 109 and connected thereto by a coupling 114.

On each side of the conveyor 39 and extending forwardly thereof is a conveyor 115 for packaging jigs 116. Each conveyor 115 includes a pair of laterally spaced endless sprocket chains 117. The sprocket chains 117 of the two conveyors 115 have a lower horizontal run 118, a semi-circular front run 119, an upper run 120, overlying the lower run 118, and a rear inclined run 121. The sprocket chains 117, at the junction of the inclined run 121 and the lower run 118, run over and under large sprocket wheels 122. These sprocket chains 117 also run under and mesh with small sprocket wheels 123 at the junction of the lower run 118 and the semi-circular run 119 and over small sprocket wheels 124 at the beginning of the upper run 120. The semi-circular run 119, between the sprocket wheels 123 and 124, run over circumferentially spaced sprocket wheels 125 similar to the sprocket wheels 123 and 124. Finally, the sprocket chains 117 run over large sprocket wheels 126 at the junction of the upper run 120 and inclined run 121.

The sprocket wheels 122 are mounted on an idle shaft 127 that extends transversely over and above the conveyors 39 and 115 and journaled in bearings 128 on the rear end portion of the frame 111. The lower sprocket wheels 123 and the upper sprocket wheels 124 are journaled on the frame 111, at the front end thereof, and the circumferentially spaced sprocket wheels 125 are journaled on a semi-circular frame 129 that forms a forward extension of the frame 111 and is supported thereby. It is important to note that the sprocket wheels 123, 124 and 125 of each pair for each pair of sprocket chains 117 are individually journaled to leave clearance therebetween, for a purpose which will presently appear.

The frame 111 includes two pairs of lower angle bars 130, the inturned horizontal flanges of which afford track rails 131 to the lower run 118 of the sprocket chains 117. This frame 111 also includes two upper pairs of angle bars 132, the inturned horizontal flanges of which afford track rails 133 for the upper run 120 of the sprocket chains 117. The sprocket chains 117 during the semi-circular run 119 travel on curved track rail sections 134 on the frame 129 between the sprocket wheels 123, 124 and 125 of the several pairs.

The pairs of sprocket wheels 126 are mounted on a transverse shaft 135 journaled in bearings 136 slidably mounted in ways 137 on the frame 111 and angle bars 132 and long conveyor tightening screws 138 have threaded engagement with the way 137 and impinge the bearings 136. Short curved track sections 139 on the track rails 131 hold the sprocket chains 117 around the under sides of the sprocket wheels 122 and direct said chains onto the track rails 131.

The following connections are provided for driving the shaft 127 and hence the sprocket wheels 122 and the packaging jig-equipped conveyors 115 from the motor drum shaft 109 to wit: a sprocket chain 140 runs over a sprocket wheel 141 on the shaft 109 and a sprocket wheel 142 on an upper countershaft 143 journaled in bearings 144 on the frame 111. A spur gear 145 on the countershaft 143 meshes with a spur gear 146 on a second or lower countershaft 147 journaled in bearings 148 on the frame 111, a second sprocket chain 149 runs over a sprocket wheel 150 on the second countershaft 147 and sprocket wheel 151 on a third countershaft 152 journaled in bearings 153 on the frame 111 below the shaft 127. Finally, a sprocket chain 154 runs over a sprocket wheel 155 on the third countershaft 152 and a sprocket wheel 156 on the shaft 127.

Each packaging jig 116 is in the form of a substantially rectangular plates 157 between the sprocket chains 117 of one of the conveyors 115 and has on its under side a transverse bar 158 at its longitudinal center. A pair of brackets 159 connect the bar 158, at its end portions, to certain of the links in the respective sprocket chains 117. During each cycle of travel of each packaging jig 116, at certain positions in said travel, it oscillates between the sprocket chain 117 to which it is attached. To afford working clearance between a packaging jig 116 and the attached sprocket chain 117, the longitudinal edges of each end portion of the jig 116 are in converging relation. On each end of each packaging jig 116 is a narrow depending flange 160. On the upper side of each packaging jig 116 is a rear transverse upstanding pushing plate 161 and a front parallel holding bar 162 for holding therebetween a group of four ears of corn $x$ removed from one of the corn jigs 38. This pushing plate 161 and holding bar 162 are spaced apart substantially equi-distant from the longitudinal center of the packaging jig 116.

It may be here stated that the corn jig conveyors 39 and the packaging jig-equipped conveyor 115 travel at the same speed. An operator, positioned at the outer side of each conveyor 115, at the rear end portion of its lower run 118 places a sheet of "cellophane" $y$ on each passing packaging jig 116 and then lifts a group of ears of corn $x$ from one of the passing corn jigs 38 and places the same on the "cellophane" sheet $y$ transversely of the underlying jig and between the pushing plate 161 and the holding bar 162, and folds the sheet of "cellophane" $y$ therearound to form a closed package.

At the front end portion of the lower run 118 of the conveyor 115 is an endless empty box conveyor 163 that passes over said lower run 118. An operator positioned within the conveyor 163 places inverted empty boxes $z$ over the "cellophane" wrapped ears of corn $x$ on the moving packaging jigs 116 between the pushing plates 161 and the holding bars 162.

As the packaging jigs 116 on each conveyor 115 are moved from the lower run 118 to the semi-circular run 119, they pass under a semi-circular track 164 in the form of a flat plate secured to the frame 129 by brackets 165. The pushing plates 161 move the boxes $z$ with the package jigs 116 during their upward travel and hold said boxes on the jigs 116 between the individual sprocket wheels 123 and 125 during the initial travel thereof and during the uppermost travel of the jigs 116, the boxes $z$ are completely arighted and supported entirely on the track 164.

A semi-circular guide rail 166, substantially concentric with the track 164, is attached to the frame 129 by brackets 167 and limits the outwardly swinging movement of the packaging jigs 116 during their upward travel.

Leading from the upper end of the semi-circular run 119 on each conveyor 115 is an inclined chute 168 having side members 169 that first curves rearwardly, outwardly and forwardly on the arc of a circle, and then straight downwardly. The forwardly and downwardly inclined straight sections of the two chutes 168 are in converging relation with their outer ends closely positioned to discharge onto the receiving end portion of an endless conveyor belt 170. This belt 170 runs over a rear idle roll 171 and a driven front roll 172 journaled in bearings 173 on a frame 174. The idle roll 171 is journaled in sliding bearings 175 in ways 176 on the frame 174. Belt-tightening screws 177 have threaded engagement with the ways 176 and impinge the bearings 175. A pair of parallel horizontal angle bars 178 form a part of the frame 174 and the inturned horizontal flanges thereof afford track rails 179 on which the longitudinal edge portions of the belt 170 travel. The vertical flanges of the angle bars extend upwardly and afford side members 180. The lower run of the conveyor belts 170 runs over a directional roll 181 journaled in bearings 182 on the angle bar 178.

The filled boxes $z$ having been turned right side up during their travel of the semi-circular run 119 of the conveyor 115 rest on the track 164 and as they successively move onto the respective inclined chute 168, they move out of engagement with the pushing plates 161 and are finally freed from the packaging jigs 116. The impetus given the boxes $z$, by the packaging jigs 116, just before they move out of engagement with the pushing plates 161, and momentum, start the boxes $z$ downwardly on the chute 168 and the force of gravity carries the same to the end thereof and onto the conveyor belt 170.

An endless box cover conveyor 183 extends transversely over the conveyor belt 170. An operator within the endless box cover conveyor 183 removes box cover having capping flange, not shown, from said conveyor and places the same on the boxes $z$ as they are successively moved past him on the conveyor belt 170 which completes the packaging of the ears of corn $x$. From the conveyor belt 170, the packaged ears of corn are transferred to a freezing or refrigerating plant.

The upper runs of the inspection belt 16, the surplus corn belt 59, the belt of the refuse conveyor 107 and the conveyor belt 170 will, in actual usage of the machine, be supported on decks or other supporting means, not shown.

While certain preferred embodiments of my invention are shown, they are to be understood as illustrative only, as it is capable of variations especially true of the packaging section where definite operations are entirely dependent upon the type of packaging box used, to meet conditions and requirements, and I contemplate such modifications as come within the spirit and scope of the appended claims.

What I claim is:

1. In a machine of the class described, a horizontally disposed endless conveyor operating in a vertical plane, directional means for guiding the section of the conveyor between its lower run and its upper run, longitudinally spaced jigs on the inner side of the conveyor, each for holding an article capped by an inverted box, and a track close to and concentric with the directional means on which the boxes at their bottoms are held and moved by the jigs, said boxes, when moved by the jigs past the track, being removed in upright position from the jigs by the force of gravity with the articles therein.

2. The structure defined in claim 1, further including conveying means on which the boxes from the track are deposited.

3. The structure defined in claim 1, further including means on the jig for pushing the box on the track.

4. The structure defined in claim 1, further including a slide forming a continuation of the track on which boxes removed from the jigs are deposited.

5. The structure defined in claim 1, further including a second conveyor, and means forming a continuation of the track on which the boxes removed from the jigs are deposited and moved to the second conveyor.

6. The structure defined in claim 1, further including a second conveyor extending forwardly of the lower run of the first noted conveyor, and a slide forming a continuation of the track on which boxes removed from the jigs are deposited, said slide being constructed and arranged to deliver boxes thereon onto the second conveyor.

7. The structure defined in claim 1 in which the directional means and the track are semicircular.

8. The structure defined in claim 1, further including an inclined slide forming a continuation of the track on which boxes removed from the jigs are deposited, said slide being constructed and arranged to deliver boxes thereon in the direction of the movement of the lower run of the conveyor.

9. The structure defined in claim 1, in which the jigs are intermediately pivoted to turn on horizontal axes that extend transversely of the conveyor, said structure further including means for holding the jigs against pivotal movement while moving with the lower run of the conveyor.

10. The structure defined in claim 1, in which the jigs are intermediately pivoted to turn on horizontal axes that extend transversely of the conveyor, said structure further including means for holding the jigs against pivotal movement while moving with the lower run of the conveyor, and a guard for limiting the pivotal movement of the jigs while moving with the conveyor past the directional means.

11. In a machine of the class described, a horizontally disposed endless conveyor operating in a vertical plane and including a pair of laterally spaced sprocket chains, directional sprocket wheels circumferentially spaced in a semi-circle over which the sprocket chains run between the lower run and the upper run thereof, longitudinally spaced box conveying jigs intermediately pivoted to the sprocket chains for swinging movement therebetween, means for holding the jigs against pivotal movement during the lower run of the sprocket chains, and a semi-circular track substantially concentric with the sprocket chains while running on the sprocket wheels, said track and jigs being spaced a distance substantially equal to a box thickness in confronting relation.

12. The structure defined in claim 11, further including track rails between the sprocket wheels for the sprocket chains.

13. The structure defined in claim 11, further including means for limiting the pivotal movement of the jigs while moving with the sprocket chains past the sprocket wheels.

14. The structure defined in claim 11, further including a downwardly inclined slide forming a continuation of the track.

GRANT H. ROGERS.

REFERENCES CITED

The following references are of record in the file of this patent:

UNITED STATES PATENTS

| Number | Name | Date |
|---|---|---|
| 619,541 | Butterfield | Feb. 14, 1899 |
| 645,862 | Letson et al. | Mar. 20, 1900 |
| 1,243,406 | Hawthorne | Oct. 16, 1917 |
| 1,816,202 | Bell et al. | July 28, 1931 |
| 2,092,763 | Le Frank | Sept. 14, 1937 |
| 2,092,773 | Nordquist et al. | Sept. 14, 1937 |
| 2,092,786 | Taylor | Sept. 14, 1937 |
| 2,109,365 | Carll et al. | Feb. 22, 1938 |
| 2,158,977 | Douthitt | May 16, 1939 |
| 2,190,936 | De Back | Feb. 20, 1940 |
| 2,271,957 | Saiberlich | Feb. 3, 1942 |
| 2,372,685 | Schaich | Apr. 3, 1945 |
| 2,429,488 | Rodery | Oct. 21, 1947 |